US009495002B2

(12) United States Patent
Low

(10) Patent No.: US 9,495,002 B2
(45) Date of Patent: Nov. 15, 2016

(54) APPARATUSES, METHODS, AND SYSTEMS FOR PROVIDING A DYNAMIC BIAS VOLTAGE TO ONE OR MORE TRANSISTORS OF A TRANSCEIVER

(71) Applicant: Intel Corporation, Santa Clara, CA (US)

(72) Inventor: Chia How Low, Simpang Ampat (MY)

(73) Assignee: Intel Corporation, Santa Clara, CA (US)

( * ) Notice: Subject to any disclaimer, the term of this patent is extended or adjusted under 35 U.S.C. 154(b) by 178 days.

(21) Appl. No.: 14/270,356

(22) Filed: May 5, 2014

(65) Prior Publication Data

US 2015/0316977 A1 Nov. 5, 2015

(51) Int. Cl.
*G06F 1/00* (2006.01)
*G06F 1/32* (2006.01)
*H04B 1/38* (2015.01)

(52) U.S. Cl.
CPC ............... *G06F 1/3293* (2013.01); *G06F 1/00* (2013.01); *G06F 1/3203* (2013.01); *H04B 1/38* (2013.01)

(58) Field of Classification Search
CPC ........ G06F 1/3271; G06F 1/325; G06F 1/00; G06F 1/3203; G06F 1/3293; H04B 1/38
USPC ........ 713/300, 340; 1/1; 345/211; 455/343.1
See application file for complete search history.

(56) References Cited

U.S. PATENT DOCUMENTS

| 5,546,016 | A | 8/1996 | Allen |
| 5,583,454 | A | 12/1996 | Hawkins et al. |
| 6,577,157 | B1 | 6/2003 | Cheung et al. |
| 7,073,080 | B2 * | 7/2006 | Lou ............. G06F 1/3203 398/197 |
| 7,075,175 | B2 | 7/2006 | Kazi et al. |
| 9,318,953 | B2 * | 4/2016 | Low ............. H02M 3/155 |
| 2004/0232710 | A1 * | 11/2004 | Jooss ............. E05B 81/78 292/336.3 |
| 2007/0049238 | A1 * | 3/2007 | Chen ............. H04W 52/0232 455/343.1 |
| 2009/0158060 | A1 * | 6/2009 | Vaajala ............. G06F 1/3203 713/300 |
| 2009/0249089 | A1 * | 10/2009 | Tremel ............. G06F 1/3203 713/300 |
| 2009/0249090 | A1 * | 10/2009 | Schmitz ............. G06F 1/3203 713/300 |
| 2011/0090203 | A1 * | 4/2011 | Cho ............. G06F 1/26 345/211 |
| 2012/0054503 | A1 * | 3/2012 | Hsiao ............. G06F 1/3206 713/300 |

(Continued)

FOREIGN PATENT DOCUMENTS

WO 2010127203 A1 11/2010
WO 2013141865 A1 9/2013

OTHER PUBLICATIONS

DE Office Action for DE Application No. 10 2015 004 071.5, dated Jul. 10, 2015, 15 pages.

(Continued)

*Primary Examiner* — Aurel Prifti
(74) *Attorney, Agent, or Firm* — Schwabe, Williamson & Wyatt, P.C.

(57) ABSTRACT

Embodiments include apparatuses, methods, and systems for providing a dynamic bias voltage to one or more transistors of a transceiver. In embodiments, a transceiver includes receive circuitry and transmit circuitry coupled to a same input/output (I/O) pad. A dynamic biasing circuit detects a voltage level of a data signal on the I/O pad, and generates a dynamic bias voltage having a value based on the detected voltage level. In some embodiments, the dynamic bias voltage is a selected one of a first bias voltage or a second bias voltage. The dynamic biasing circuit provides the dynamic bias voltage to one or more transistors of the transceiver to protect the transistors from electrical overstress.

18 Claims, 7 Drawing Sheets

(56) References Cited

U.S. PATENT DOCUMENTS

2012/0226929 A1* 9/2012 Lee .................... G06F 11/3041
  713/340
2014/0232710 A1* 8/2014 Low .................... G09G 3/3696
  345/211

OTHER PUBLICATIONS

Office Action and Search Report issued Mar. 22, 2016 for Taiwan Patent Application No. 104110456, 17 pages.

* cited by examiner

APPARATUSES, METHODS, AND SYSTEMS FOR PROVIDING A DYNAMIC BIAS VOLTAGE TO ONE OR MORE TRANSISTORS OF A TRANSCEIVER

FIELD

Embodiments of the present invention relate generally to the technical field of electronic circuits, and more particularly to dynamic biasing circuits for a transceiver.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

In wired communication devices, transceiver circuits are coupled to one or more input/output (I/O) pads to transmit and/or receive data signals on one or more transmission lines coupled to the respective I/O pads. The transceiver circuits typically include transistors coupled to the I/O pad. New process technologies allow for transistors of smaller size to be used. However, the smaller transistors may be subjected to electrical overstress at lower voltage levels than larger transistors.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings that form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

Figure 1:
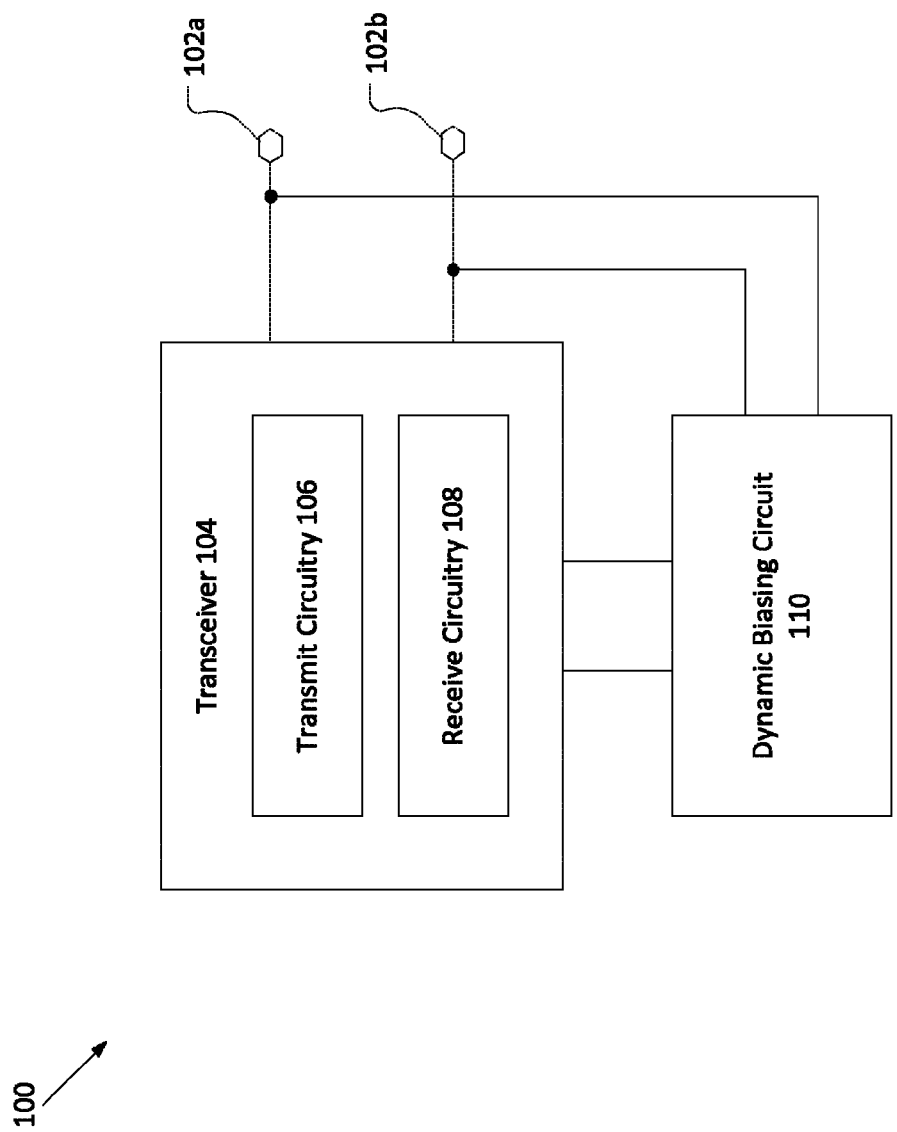
FIG. 1 schematically illustrates a circuit with a transceiver and a dynamic biasing circuit in accordance with various embodiments.

FIG. 1 schematically illustrates a circuit 100 that may be used to communicate over one or more input/output (I/O) pads 102*a-b* in accordance with various embodiments. Circuit 100 may include a transceiver 104 coupled to the I/O pads 102*a-b*. The transceiver 104 may be included in a communication device to communicate data between the communication device and another communication device. The I/O pads 102*a-b* may be coupled to respective transmission lines to pass signals between the communication devices.

In various embodiments, the transceiver 104 may include transmit circuitry 106 and receive circuitry 108. Transmit circuitry 106 may be coupled to the I/O pads 102*a-b* to transmit a data signal on the I/O pads 102*a-b*. Receive circuitry 108 may be coupled to the I/O pads 102*a-b* to receive a data signal on the I/O pads 102*a-b*.

The transceiver 104 may transmit and/or receive data signals in accordance with any suitable communication protocol, such as a Universal Serial Bus (USB) interface, a general-purpose input/output (GPIO) interface, a Camera Serial Interface (CSI), a Mobile Industry Processor Interface (MIPI) M-PHY interface, a Peripheral Component Interconnect express (PCIe) interface, and/or Serial Advanced Technology Attachment (SATA) interface. In some embodiments, the transceiver 104 may be used to transmit and/or receive a differential data signal. Accordingly, the transceiver may be coupled to a pair of I/O pads 102a-b coupled to respective transmission lines to pass the differential data signals. In some embodiments, additional transmission lines may be coupled between the communication devices, for example, to carry a ground signal and/or electrical power. In some embodiments, at least a portion of the transmission lines may be part of a cable connected between the communication devices.

In other embodiments, the transceiver 104 may transmit a single-ended data signal on a single transmission line.

In some embodiments, the data signal at the I/O pad 102a-b may swing between a first voltage level (e.g., 0 Volts (V)) and a second voltage level (e.g., a supply voltage Vcc) to represent bits of data. For example, in some embodiments, Vcc may be 3.3 V, and the I/O pad 102a-b may swing between 0 V and 3.3 V.

In various embodiments, the circuit 100 may further include a dynamic biasing circuit 110 that is coupled to the transceiver 104 and the I/O pads 102a-b. In some embodiments, the dynamic biasing circuit 110 may be included in a same integrated circuit (e.g., on a same chip) with the transceiver 104 and/or I/O pads 102a-b.

The dynamic biasing circuit 110 may provide a dynamic bias voltage to one or more transistors of the transceiver 104. The dynamic bias voltage may have a value that is based on the voltage level of the data signal on the I/O pad 102a-b. For example, in some embodiments, the dynamic bias voltage may be a selected one of a first bias voltage or a second bias voltage, where the first or second bias voltage is selected based on the voltage level of the data signal at the I/O pad 102a-b. In some embodiments, the dynamic bias voltage may be the first bias voltage when the voltage level of the data signal is about the first voltage level (e.g., 0 V), and may be the second bias voltage when the voltage level of the data signal is about the second voltage level (e.g., Vcc). In some embodiments, the second bias voltage may be greater than the first bias voltage. For example, in one non-limiting embodiment, the first bias voltage may be about Vcc/3 (e.g., 1.1 V for Vcc of 3.3 V) and the second bias voltage may be about 2Vcc/3 (e.g., 2.2 V for Vcc of 3.3 V).

In some embodiments, the dynamic bias voltage may generate a first dynamic bias voltage that is based on the voltage level of the I/O pad 102a and a second dynamic bias voltage that is based on the voltage level of the I/O pad 102b. The dynamic bias voltage may be provided to one or more transistors of the transceiver 104 that are coupled to the respective I/O pad 102a-b. The dynamic bias voltage may prevent a voltage drop across the one or more transistors from being greater than an electrical overstress (EOS) limit of the transistors, thereby preventing an EOS condition.

Figure 2:
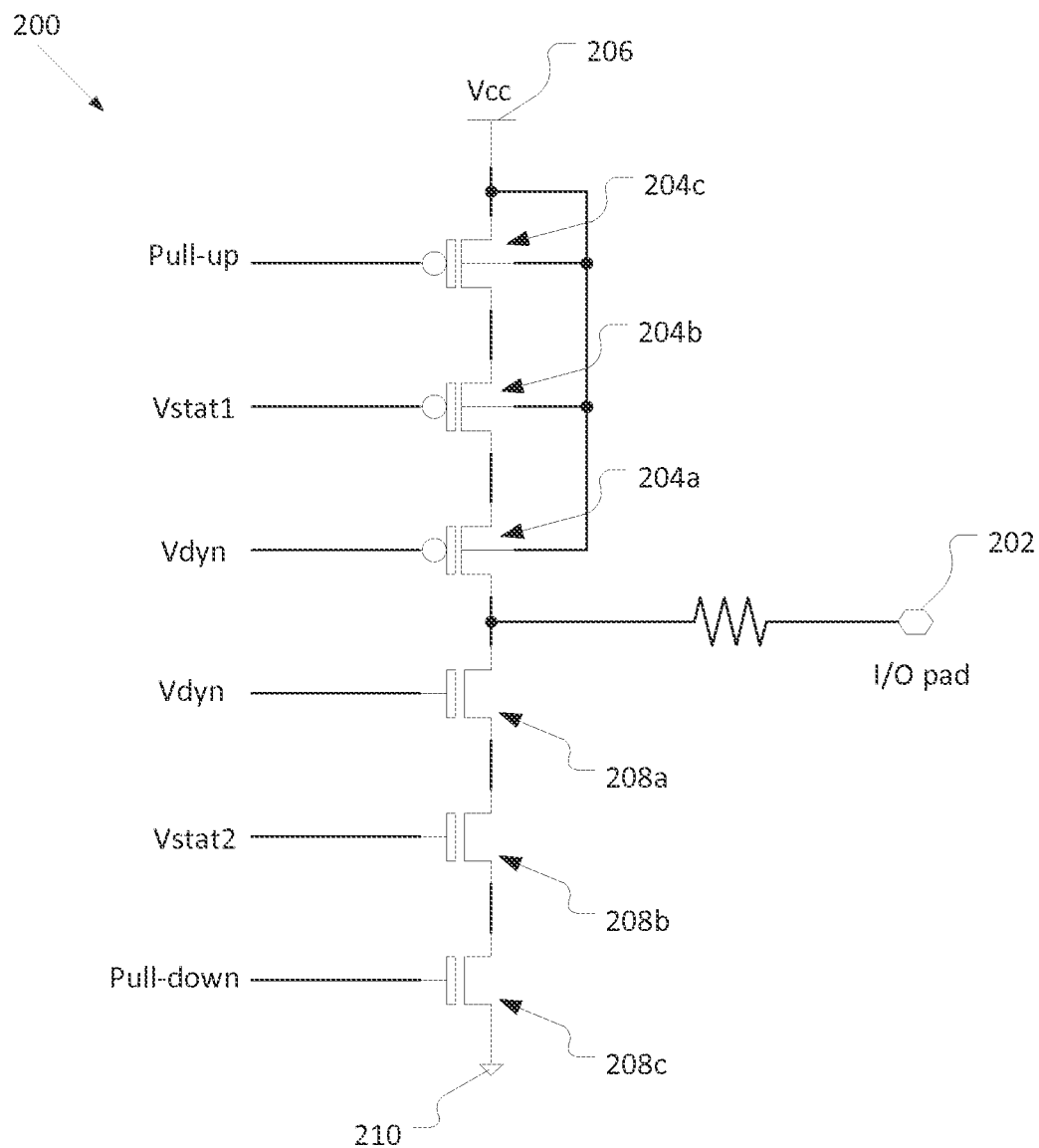
FIG. 2 illustrates an example transmit driver that may be used with the dynamic biasing circuit of FIG. 1, in accordance with various embodiments.

FIG. 2 illustrates a transmit driver 200 that may be included in the transmit circuitry 106 of the transceiver 104 in accordance with various embodiments. Transmit driver 200 is shown as an example, and in other embodiments, the dynamic biasing circuit 110 may be used with another suitable transmit driver. Transmit driver 200 may be coupled to an I/O pad 202 and may be used to transmit a data signal on a transmission line coupled to the I/O pad 202. The I/O pad 202 may correspond to the I/O pad 102a or 102b of circuit 100.

In embodiments in which the transceiver 104 transmits a differential data signal, separate transmit drivers 200 may be coupled to the different I/O pads 102a-b to drive data signals on the respective transmission lines. For example, a first transmit driver 200 may drive a positive data signal (e.g., one half of the differential data signal) on a first transmission line coupled to the I/O pad 102a, and a second transmit driver 200 may drive a negative data signal (e.g., the other half of the differential data signal) on a second transmission line coupled to the I/O pad 102b. Additionally, or alternatively, multiple transmit drivers 200 may be coupled to the same I/O pad 102a-b.

The transmit driver 200 may include a plurality of pull-up transistors 204a-c coupled in series with one another between the I/O pad 202 and a supply rail 206. The supply rail 206 may receive a supply voltage Vcc. The transmit driver 200 may further include a plurality of pull-down transistors 208a-c coupled in series with one another between the I/O pad 202 and a ground terminal 210. The pull-up transistors 204a-c may be selectively turned on to increase the voltage at the I/O pad 202 (e.g., to Vcc). The pull-down transistors 208a-c may be selectively turned on to decrease the voltage level at the I/O pad (e.g., to 0 V). In various embodiments, the putt-up transistor 204c may receive a pull-up signal to selectively turn on or off the pull-up transistor 204c. Additionally, the pull-down transistor 208c may receive a pull-down signal to selectively turn on or off the pull-down transistor 208c. During a transmit mode of the transceiver, the pull-up and pull-down signals may be used to drive the voltage level of the data signal at the I/O pad 202.

In various embodiments, the pull-up transistors 204a-c and/or pull-down transistors 208a-c may be any suitable type of transistors. For example, in some embodiments, the pull-up transistors 204a-c may be p-type transistors (e.g., p-type field-effect transistors (FETs)), and/or the pull-down transistors 208a-c may be n-type transistors (e.g., n-type FETs). Other types of transistors may be used in other embodiments.

In various embodiments, the pull-up transistors 204a-b and pull-down transistors 208a-b may receive respective bias voltages (e.g., at the gate terminal of the transistor). The bias voltages may facilitate operation of the transmit driver 200 during the transmit mode of the transceiver and/or may protect one or more of the pull-up transistors 204a-b and/or pull-down transistors 208a-b from EOS during the receive mode and/or transmit mode of the transceiver, in various embodiments, one or more of the pull-up transistors 204a-b and/or one or more of the pull-down transistors 208a-b may receive the dynamic bias voltage, Vdyn, provided by the dynamic biasing circuit 110. For example, in some embodiments, the pull-up transistor 204a and the pull-down transistor 208a may receive the dynamic bias voltage. In various embodiments, the dynamic bias voltage may have a value that is based on the voltage level of the data signal on the I/O pad 202. For example, in some embodiments, the dynamic bias voltage may be a selected one of a first bias voltage or a second bias voltage, where the first or second bias voltage is selected based on the voltage level of the data signal at the I/O pad 202. In some embodiments, the dynamic bias voltage may be the first bias voltage when the voltage level of the data signal is about 0 V, and may be the second bias voltage when the voltage level of the data signal is about Vcc.

Alternatively, or additionally, the dynamic bias voltage may be the first bias voltage when she voltage level of the data signal at the I/O pad 202 is below a threshold, and the dynamic bias voltage may be the second bias voltage when the voltage level of the data signal at the I/O pad 202 is above the threshold. In some embodiments, the threshold may be, for example Vcc/2.

In some embodiments, the first bias voltage may be about Vcc/3, and the second bias voltage may be about 2 Vcc/3. For example, if Vcc is 3.3 V, the first bias voltage may be about 1.1 V, and the second bias voltage may be about 2.2 V. Other embodiments may use other values for the first bias voltage and/or second bias voltage.

In some embodiments, the pull-up transistor 204b and/or pull-down transistor 208b may receive static bias voltages Vstat1 and Vstat2, respectively, that are the same regardless of the voltage level of the data signal. In some embodiments, the pull-up transistor 204b may receive a static bias voltage equal to the second bias voltage. For example, Vstat1 may be about 2 Vcc/3 (e.g., 2.2 V if Vcc is 3.3 V). In some embodiments, the pull-down transistor 208b may receive a static bias voltage equal to the first bias voltage. For example, Vstat2 may be about Vcc/3 (e.g., 1.1 V if Vcc is 3.3 V). In other embodiments, the pull-up transistor 204b and/or pull-down transistor 208b may receive dynamic bias voltages, which may be different from the dynamic bias voltage received by the pull-up transistor 204a and/or pull-down transistor 208a.

In some embodiments, the pull-up transistor 204c and/or pull-down transistor 208c, which receive the pull-up signal or pull-down respectively, in the transmit mode, may receive respective static bias voltages in the receive mode. For example, the pull-up transistor 204c may receive a static bias voltage of about Vcc (e.g., 3.3 V), and the pull-down transistor 208c may receive a static bias voltage of about 0 V in the receive mode.

In various embodiments, the dynamic bias voltage may allow the use of smaller transistors (with lower EOS limits) to be used for the pull-up transistors 204a-c and/or pull-down transistors 208a-c than can be used for a transmit driver that uses static bias voltages (e.g., a bias voltage that always has the same value). For example, in some non-limiting embodiments, the transistors may be 1.5 V transistors having an EOS limit of 1.5 V. For signaling on the I/O pad 202 that uses a supply voltage Vcc of greater than twice the EOS limit of the transistors 204a-c and 208a-c (e.g., 3.3 V signaling in which Vcc is 3.3 V, as used by the USB 2.0 interface), there is no value for a static bias voltage that may be provided to the pull-up transistor 204a and pull-down transistor 208a without causing a voltage across one of the pull-up transistor 204a or pull-down transistor 208a that is greater than the EOS limit of the transistor. In contrast, the dynamic bias voltage provided by the dynamic biasing circuit 110 may prevent a voltage drop across the pull-up transistor 204a and/or pull-down transistor 208a from being greater than the EOS limit of the transistor, thereby preventing electrical overstress of the transistors.

Figure 3:
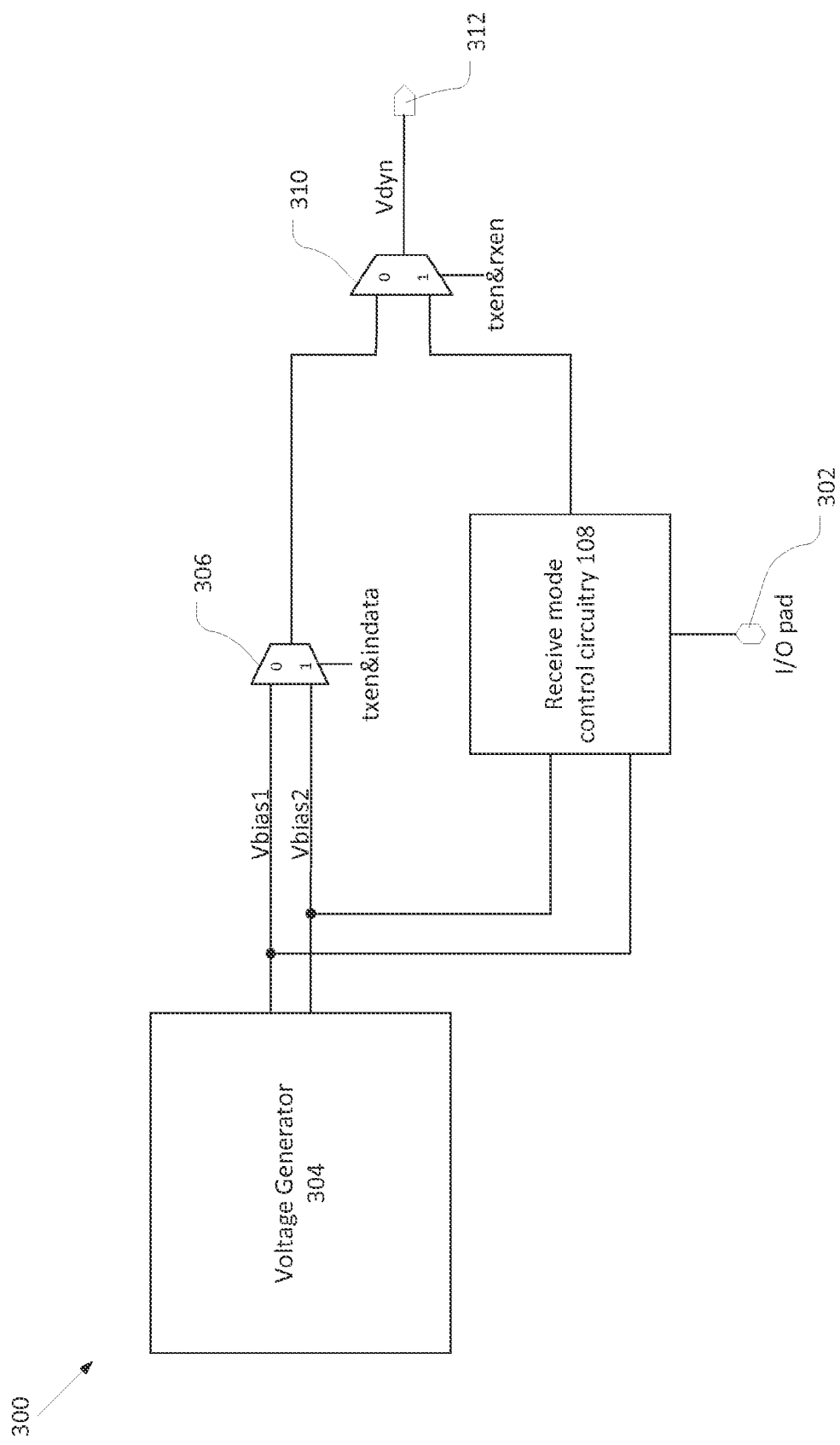
FIG. 3 illustrates a circuit that may be used to generate a dynamic bias voltage for a transmit driver, in accordance with various embodiments.

FIG. 3 illustrates a circuit 300 that may be included in the dynamic biasing circuit 110 in accordance with some embodiments. The circuit 300 may be used to provide a dynamic bias voltage to one or more transistors of a transmit driver (e.g., pull-up transistor 204a and/or pull-down transistor 208a of transmit driver 200). In some embodiments, the circuit 300 may provide the dynamic bias voltage during a receive mode of the transceiver 104 to prevent a voltage drop across the one or more transistors from being greater than an EOS limit of the transistors, thereby preventing an EOS condition. The dynamic bias voltage may have a value that is based on the voltage level of the data signal on an I/O pad 302. The I/O pad 302 may correspond to the I/O pad 102a or 102b of circuit 100.

In various embodiments, the circuit 300 may include a voltage generator 304 to generate the first bias voltage (Vbias1) and the second bias voltage (Vbias2). The circuit 300 may further include transmit mode control circuitry 306 and receive mode control circuitry 308 that generate respective bias voltages. A multiplexer 310 may be coupled to the transmit mode control circuitry 306 and receive mode control circuitry 308 to receive the respective bias voltages. The multiplexer 310 may be further coupled to an output terminal 312. The multiplexer 310 may pass the bias voltage generated by the transmit mode control circuitry 306 to the output terminal 312 during the transmit mode and may pass the bias voltage generated by the receive mode control circuitry 308 during the receive mode. The multiplexer 310 may receive a receive enable signal (rxen) and/or a transmit enable signal (txen) to indicate whether the transceiver is in the transmit mode or the receive mode.

In other embodiments, the circuit 300 may not include separate transmit mode control circuitry 306 and receive mode control circuitry 308. In some such embodiments, the receive mode control circuitry 308 as described herein may generate the dynamic bias voltage for both the receive and transmit modes of the transceiver 104.

In various embodiments, the transmit mode control circuitry 306 may be coupled to the voltage generator 304 to receive the first and second bias voltages. The transmit mode control circuitry 306 may further receive incoming data (indata) that is to be transmitted in the data signal on the I/O pad 302 and the transmit enable signal. The transmit mode control circuitry 306 may know what the voltage level of the data signal on the I/O pad 302 is based on the incoming data. Accordingly, the transmit mode control circuitry 306 may select either the first or second bias voltage based on the incoming data and may pass the selected bias voltage to the multiplexer 310.

However, in the receive mode, the circuit 300 may not know the values of the data that is received on the I/O pad 302. Accordingly, the dynamic bias circuit 300 may include the receive mode control circuitry 308 to determine the value of the dynamic bias voltage during the receive mode of the transceiver.

The receive mode control circuitry 308 may be coupled to the voltage generator 304 to receive the first and second bias voltages. The receive mode control circuitry 308 may further be coupled to the I/O pad 302. In various embodiments, the receive mode control circuitry 308 may detect the voltage level of the data signal on the I/O pad 302. For example, the receive mode control circuitry 308 may detect the voltage level by sensing the data signal on the I/O pad 302. The receive mode control circuitry 308 may select either the first bias voltage or the second bias voltage based on the detected voltage level of the data signal and may pass the selected bias voltage to the pull-up transistor 204a and/or pull-down transistor 208a (e.g., via the multiplexer 310).

For example, in some embodiments, the receive mode control circuitry 308 may select the first bias voltage when the voltage level of the data signal is about 0 V, and may select the second bias voltage when the voltage level of the data signal is about Vcc.

Alternatively, or additionally, in some embodiments, the receive mode control circuitry 308 may select the first bias voltage if the voltage level of the data signal is less than a threshold, and may select the second bias voltage if the voltage level of the data signal is greater than the threshold. The threshold may be, for example, about Vcc/2 (e.g., about 1.65 V when Vcc is 3.3 V).

Accordingly, the dynamic bias voltage provided by the receive mode control circuitry 308 may ensure that there is not a voltage drop across the pull-up transistor 204a and/or pull-down transistor 208a that is greater than the EOS limit of the transistor during the receive mode of the transceiver 104. Therefore, the receive mode control circuitry 308 may prevent damage to the transmit driver 200 during the receive mode.

Figure 4:
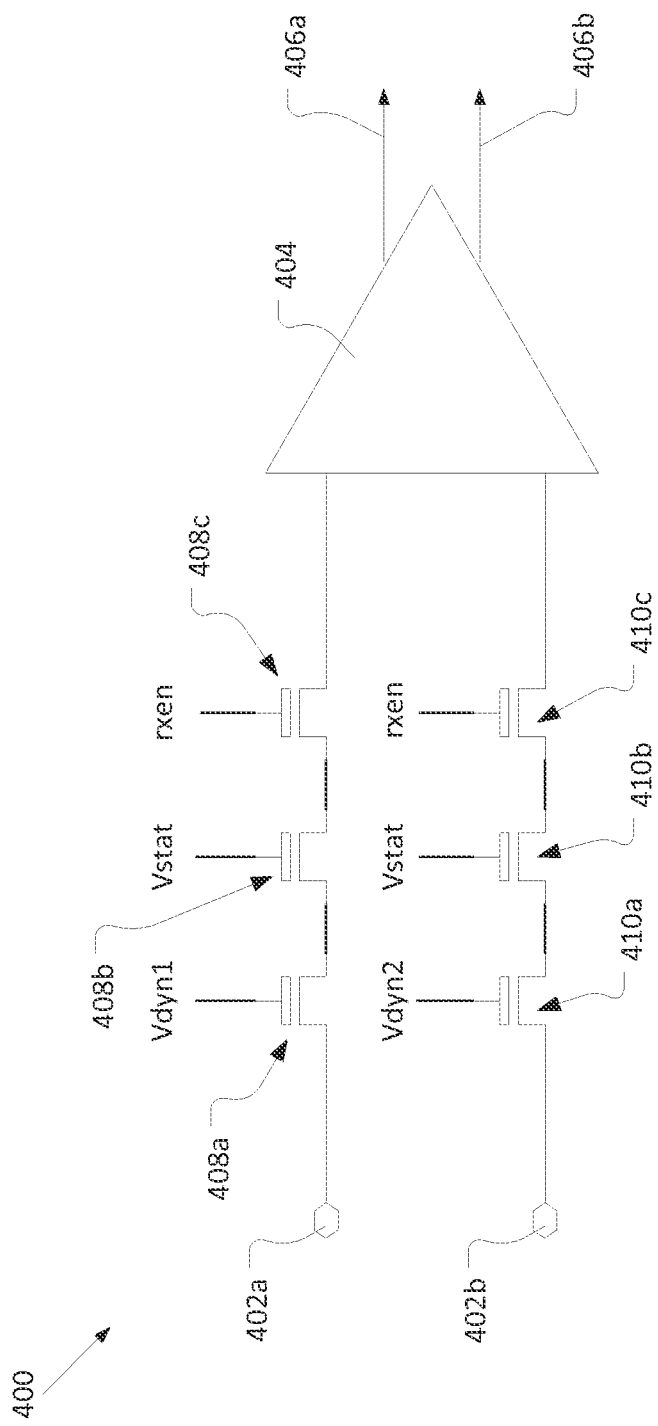
FIG. 4 illustrates an example receive circuit that may be used with the dynamic biasing circuit of FIG. 1, in accordance with various embodiments.

FIG. 4 illustrates a receive circuit 400 that may be included in the receive circuitry 108 of transceiver 104 in accordance with various embodiments. The receive circuit 400 may be used to receive data signals via I/O pads 402a-b. The I/O pads 402a-b may correspond to I/O pads 102a-b. The receive circuit 400 may include an amplifier 404 that may process the received data signals and generate respective output signals at output terminals 406a-b. The receive circuit 400 may further include EOS protection transistors 408a-c coupled between the I/O pad 402a and the amplifier 404, and EOS protection transistors 410a-c coupled between the I/O pad 402b and the amplifier 404. The receive circuit 400 may include any suitable number of two or more EOS protection transistors 408a-c and/or EOS protection transistors 410a-c. In some embodiments, the EOS protection transistors 408a-c and/or EOS protection transistors 410a-c may be n-type transistors.

In various embodiments, the EOS protection transistors 408c and 410c may receive a receive enable signal (rxen) to indicate when the transceiver 104 is in the receive mode. In some embodiments, the receive enable signal may be about 0 V when the transceiver 104 is not in the receive mode (e.g., when the transceiver 104 is in the transmit mode), thereby turning the transistors 408c and 410c off in some embodiments, the receive enable signal may be about 1 V when the transceiver 104 is in the receive mode, thereby turning the transistors 408c and 410c on.

In various embodiments, one or more of the EOS protection transistors 408a-b and/or one or more of the EOS protection transistors 410a-b may receive a dynamic bias voltage as described herein. The dynamic bias voltage may have a value that is based on a voltage level at the I/O pad 102a-b coupled to the respective transistor.

For example, in some embodiments, the EOS protection transistor 408a may receive a first dynamic bias voltage (Vdyn1). The first dynamic bias voltage may have a value of about 2.2 V when the voltage level of the data signal at the pad 402a is 3.3 V, and may have a value of about 1.1 V when the voltage level of the data signal at the I/O pad 402a is 0 V.

In some embodiments, the EOS protection transistor 408b may receive a second dynamic bias voltage (Vdyn2). The second dynamic bias voltage may have a value of about 2.2 V when the voltage level of the data signal at the I/O pad 402b is 3.3 V, and may have a value of about 1.1 V when the voltage level of the data signal at the I/O pad 402b is 0 V.

In some embodiments, the EOS protection transistors 408b and 410b may receive a static bias voltage. The static bias voltage may have a value of, for example, about 1.1 V.

In various embodiments, the dynamic bias voltages provided to the EOS protection transistors 408a and 410a may allow the use of smaller transistors in the receive circuit 400 (e.g., for transistors 408a-c and/or 410a-c). For example, in some embodiments, the transistors 408a-c and/or 410a-c may have an EOS limit of about 1.5 V.

It will be apparent that the values of the bias voltages and transistor size discussed for the receive circuit 400 are given as examples, and other values of the bias voltages (including the dynamic bias voltages) and/or other sizes of transistors may be used in other embodiments.

Figure 5:
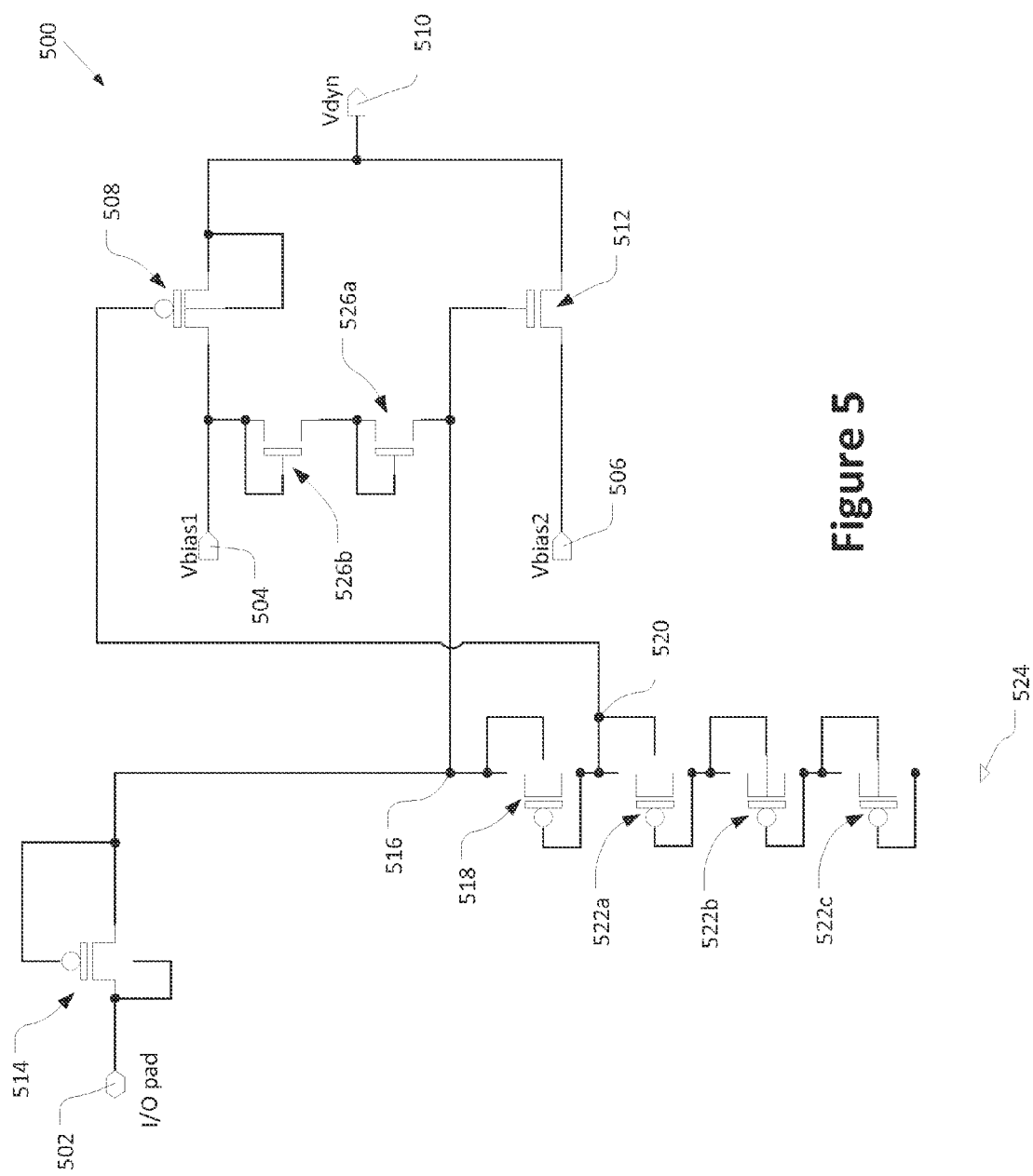
FIG. 5 illustrates an example circuit that may be included in the dynamic biasing circuit of FIG. 1, in accordance with various embodiments.

FIG. 5 illustrates one example of a circuit 500 that may be used to generate a dynamic bias voltage in accordance with various embodiments. The dynamic bias voltage may be provided to one or more transistors of a transceiver (e.g., transceiver 104). For example, the dynamic bias voltage may be provided to one or more transistors of transmit circuitry of the transceiver (e.g., pull-up transistor 204a and/or pull-down transistor 208a of transmit driver 200) and/or to one or more transistors of receive circuitry of the transceiver (e.g., EOS protection transistor 408a and/or EOS protection transistor 410a of receive circuit 400).

In some embodiments, the circuit 500 may be included in the dynamic biasing circuit 110 of FIG. 1 and/or in the receive mode control circuitry 308 of FIG. 3. The circuit 500 may be coupled to an I/O pad 502. The I/O pad 502 may correspond to the I/O pad 102a or 102b of circuit 100. The circuit 500 may include a first bias terminal 504 to receive the first bias voltage (Vbias1) and a second bias terminal 506 to receive the second bias voltage (Vbias2).

The circuit 500 may include a first switch transistor 508 coupled between the first bias terminal 504 and an output terminal 510 to selectively pass the first bias voltage to the output terminal 510 as the dynamic bias voltage (Vdyn). The circuit 500 may further include a second switch transistor 512 coupled between the second bias terminal 506 and the output terminal 510 to selectively pass the second bias voltage to the output terminal 510 as the dynamic bias voltage. The first switch transistor 508 and second switch transistor 512 may be controlled by signals received at their respective gate terminals. In some embodiments, the first switch transistor 508 may be a p-type transistor, and the second switch transistor 512 may be an n-type transistor.

In various embodiments, the circuit 500 may further include a diode 514 coupled between the I/O pad 502 and a first node 516. In some embodiments, the diode 514 may be a diode-connected transistor, such as a diode-connected p-type transistor. The circuit 500 may further include a diode 518 coupled between the first node 516 and a second node 520. In some embodiments, the diode 518 may be a diode-connected transistor, such as a diode-connected p-type transistor. In various embodiments, the circuit 500 may further include one or more diodes 522a-c coupled between the second node 520 and a ground terminal 524. In some embodiments, the diodes 522a-c may be diode-connected transistors, such as diode-connected p-type transistors.

In various embodiments, the gate terminal of the first switch transistor 508 may be coupled to the second node 520, and the gate terminal of the second switch transistor 512 may be coupled to the first node 516. The circuit 500 may further include one or more diodes 526a-b coupled between the first bias terminal 504 and the gate terminal of the second switch transistor 512.

As discussed above, the voltage level of the data signal at the I/O pad 102 may swing between 0 V and Vcc. When the voltage level of the I/O pad swings from 0 V to Vcc, diode 514, diode 518, and diodes 522a-c may be on. Using a Vcc of 3.3 V as an example, the voltage at the first node 516 may settle to about 2.7 V, and the voltage at the second node 520 may settle to about 2.0V. Accordingly, the first switch transistor 508 may be turned off, while the second switch transistor 512 is turned on. Therefore, the circuit 500 may pass the second bias voltage (e.g., 2.2 V) to the output terminal 510. The diodes 526a-b may be off, because the voltage at the first node 516 (to which the source terminal of the diode 526a is coupled) is higher than the voltage at the gate and drain terminals of the diode 526a.

When the voltage level at the I/O pad 102 swings from Vcc to 0 V, diodes 526a-b, diode 518, and diodes 522a-c may be on. Accordingly, the voltage at the first node 516 may settle to about 0.8 V, and the voltage at the second node 520 may settle to about 0.65 V. Therefore, the first switch transistor 508 may be on and the second switch transistor 512 may be off, thereby passing the first bias voltage (e.g., 1.1 V) to the output terminal 510. The diodes 526a-b may ensure that the first node 516 settles to a voltage level that will not cause an electrical overstress of the second switch transistor 512 that has a drain voltage of the second bias voltage (e.g., 2.2 V).

In various embodiments, the circuit 500 may use 1.5 V transistors and operate with an I/O pad that swings from 0 V to 3.3 V without subjecting any of the transistors of the circuit 500 to electrical overstress.

Figure 6:
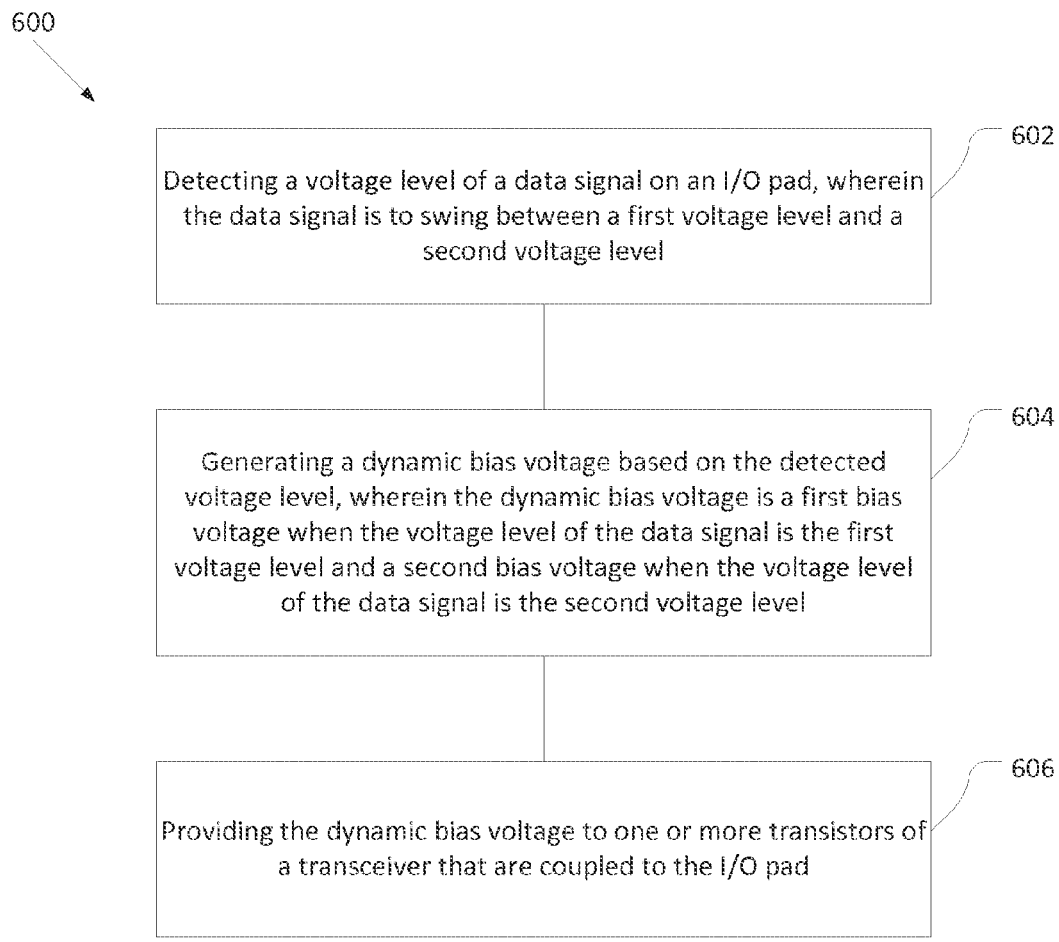
FIG. 6 illustrates a method for providing a dynamic bias voltage for a transceiver, in accordance with various embodiments.

FIG. 6 illustrates a method 600 for providing a dynamic bias voltage for a transceiver (e.g., transceiver 104) in accordance with various embodiments. In some embodiments, an apparatus (e.g., the transceiver or an apparatus including the transceiver) may include one or more non-transitory media having instructions, stored thereon, that when executed cause the apparatus to perform the method 600.

At 602, the method 600 may include detecting a voltage level of a data signal on an I/O pad (e.g., I/O pad 102). In some embodiments, the voltage level of the data signal may swing between a first voltage level (e.g., 0 V) and a second voltage level (e.g., Vcc) to communicate data.

At 604, the method 600 may further include generating a dynamic bias voltage based on the detected voltage level. The dynamic bias voltage may be a first bias voltage when the voltage level of the data signal is the first voltage level and may be a second bias voltage when the voltage level of the data signal is the second voltage level.

At 606, the method 600 may further include providing the dynamic bias voltage to one or more transistors of a transceiver that are coupled to the I/O pad. The one or more transistors may be, for example, pull-up transistor 204a and/or pull-down transistor 208a of transmit driver 200, and/or EOS protection transistor 408a and/or EOS protection transistor 410a of receive circuit 400.

In some embodiments, the method 600 may be performed responsive to a transceiver that includes the transmit driver being in a receive mode.

Figure 7:
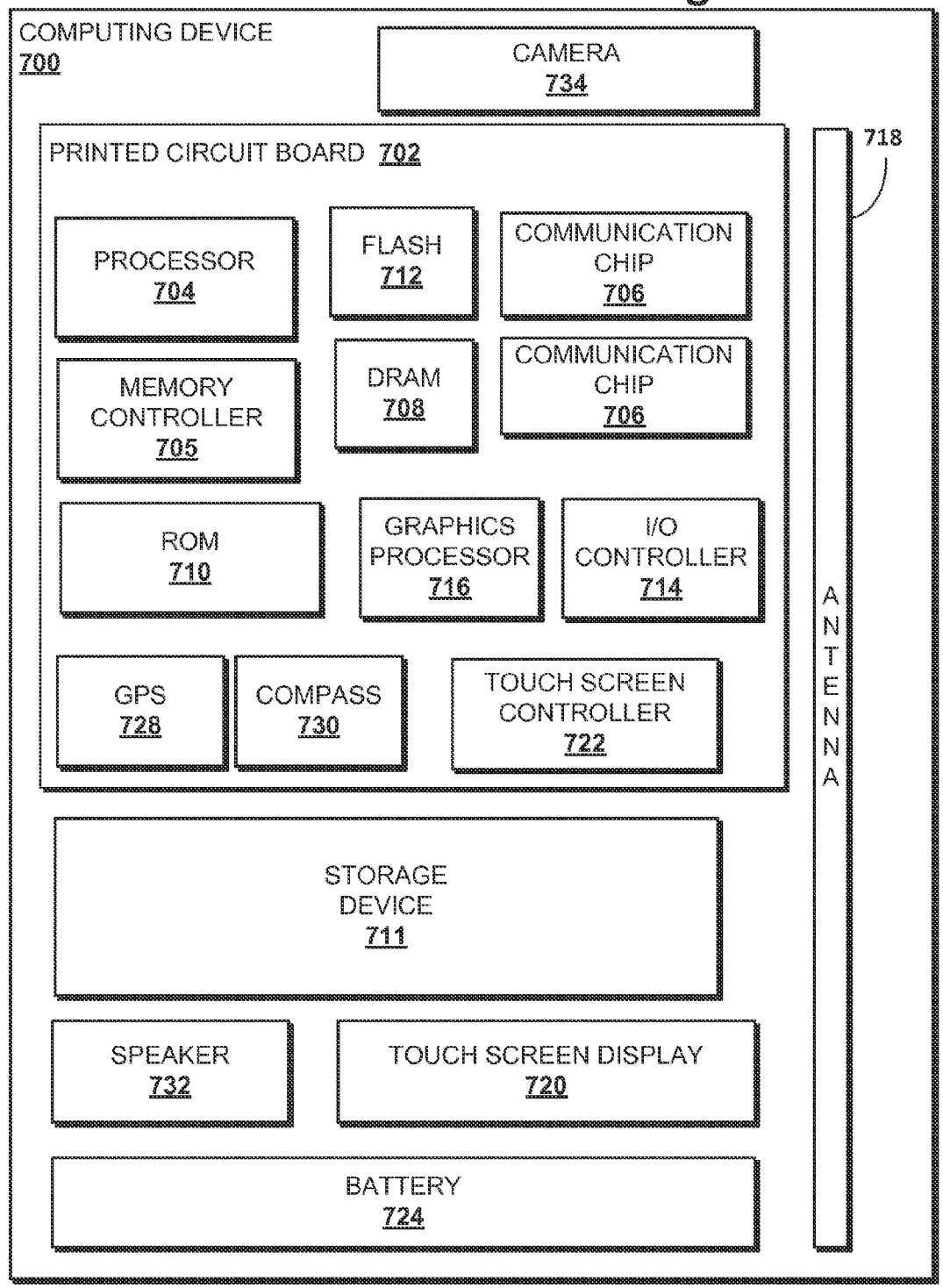
FIG. 7 illustrates an example system configured to employ the apparatuses and methods described herein, in accordance with various embodiments.

FIG. 7 illustrates an example computing device 700 that may employ the apparatuses and/or methods described herein (e.g., circuit 100, transmit driver 200, circuit 300, receive circuit 400, circuit 500, method 600), in accordance with various embodiments. As shown, computing device 700 may include a number of components, such as one or more processor(s) 704 (one shown) and at least one communication chip 706. In various embodiments, the one or more processor(s) 704 each may include one or more processor cores. In various embodiments, the at least one communication chip 706 may be physically and electrically coupled to the one or more processor(s) 704. In further implementations, the communication chip 706 may be part of the one or more (processor(s) 704. In various embodiments, computing device 700 may include printed circuit board (PCB) 702. For these embodiments, the one or more processor(s) 704 and communication chip 706 may be disposed thereon. In alternate embodiments, the various components may be coupled without the employment of PCB 702.

Depending on its applications, computing device 700 may include other components that may or may not be physically and electrically coupled to the PCB 702. These other components include, but are not limited to, memory controller 705, volatile memory (e.g., dynamic random access memory (DRAM) 708), non-volatile memory such as read only memory (ROM) 710, flash memory 712, storage device 711 (e.g., a hard-disk drive (HDD)), no I/O controller 714, a digital signal processor (not shown), a crypto processor (not shown), a graphics processor 716, one or more antenna 718, a display (not shown), a touch screen display 720, a touch screen controller 722, a battery 724, an audio codec (not shown), a video codec (not shown), a global positioning system (GPS) device 728, a compass 730, an accelerometer (not shown), a gyroscope (not shown), a speaker 732, a camera 734, and a mass storage device (such as hard disk drive, a solid state drive, compact disk (CD), digital versatile disk (DVD)) (not shown), and so forth. In various embodiments, the processor 704 may be integrated on the same die with other components to form a System on Chip (SoC).

In some embodiments, the one or more processor(s) 704, flash memory 712, and/or storage device 711 may include associated firmware (not shown) storing programming instructions configured to enable computing device 700, in response to execution of the programming instructions by one or more processor(s) 704, to practice all or selected aspects of the methods described herein (e.g., method 600). In various embodiments, these aspects may additionally or alternatively be implemented using hardware separate from the one or more processor(s) 704, flash memory 712, or storage device 711.

In various embodiments, one or more components of the computing device 700 may include the circuit 100, transmit driver 200, circuit 300, receive circuit 400, and/or circuit 500 described herein. For example, the circuit 100, transmit driver 200, circuit 300, receive circuit 400, and/or circuit 500 may be included in I/O controller 714, processor 704, memory controller 705, and/or another component of computing device 700. In some embodiments, I/O controller 714 may interface with one or more external devices to transmit and/or receive a data signal using the transceiver 104. In other embodiments, the transceiver 104 may be used to transmit and/or receive a data signal between two components of the computing device 700.

The communication chips 706 may enable wired and/or wireless communications for the transfer of data to and from the computing device 700. The term "wireless" and its derivatives rimy be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth, and a second communication chip 706 may be dedicated to longer range wireless communications such as GPS, EDGE, GPRS, CDMA, WiMAX, LTE, Ev-DO, and others.

In various implementations, the computing device 700 may be a laptop, a netbook, a notebook, an ultrabook, a smartphone, a computing tablet, a personal digital assistant (PDA), an ultra-mobile PC, a mobile phone, a desktop computer, a server, a printer, a scanner, a monitor, a set-top box, an entertainment control unit (e.g., a gaming console or automotive entertainment unit), a digital camera, an appliance, a portable music player, or a digital video recorder. In further implementations, the computing device 700 may be any other electronic device that processes data.

Some non-limiting Examples are provided below.

Example 1 is a circuit for providing a dynamic bias voltage to a transceiver, the circuit comprising: an input/output (I/O) pad to receive a data signal; a transceiver coupled to the I/O pad, the transceiver including a transistor coupled to the I/O pad; and a dynamic biasing circuit coupled to the I/O pad and the transceiver. The dynamic biasing circuit is to: detect a voltage level of the data signal on the I/O pad; generate a dynamic bias voltage having a value based on the detected voltage level of the data signal; and provide the dynamic bias voltage to the transistor of the transceiver.

Example 2 is the circuit of Example 1, wherein the dynamic biasing circuit is to selectively generate a first bias voltage or a second bias voltage as the dynamic bias voltage.

Example 3 is the circuit of Example 2, wherein the dynamic biasing circuit includes: a first voltage terminal to receive the first bias voltage; a second voltage terminal to receive the second bias voltage; an output terminal to receive the dynamic bias voltage; a first switch transistor coupled between the first voltage terminal and the output terminal; a second switch transistor coupled between the second voltage terminal and the output terminal; a first node coupled to the I/O pad via a first diode; and a second diode coupled between the first node and a second node; wherein a gate terminal of the second switch transistor is coupled to the first node; and wherein a gate terminal of the first switch transistor is coupled to the second node.

Example 4 is the circuit of Example 3, wherein the dynamic biasing circuit further includes one or more diodes coupled between the first voltage terminal and the gate terminal of the second switch transistor.

Example 5 is the circuit of any one of Examples 1 to 4, wherein the transceiver includes a transmit driver, and wherein the transistor is a pull-up transistor of the transmit driver, the pull-up transistor coupled between the I/O pad and a supply rail.

Example 6 is the circuit of Example 5, wherein the transmit driver further includes a pull-down transistor coupled between the I/O pad and a ground terminal, wherein the dynamic biasing circuitry is further to provide the dynamic bias voltage to the pull-down transistor.

Example 7 is the circuit of Example 5, wherein the pull-up transistor is a first pull-up transistor, wherein the transmit driver includes a plurality of pull-up transistors including the first pull-up transistor and a second pull-up transistor that is to receive a pull-up signal.

Example 8 is the circuit of Example 7, wherein the transmit driver further includes a third pull-up transistor that is to receive a static bias voltage.

Example 9 is the circuit of Example 8, wherein the first, second, and third pull-up transistors are coupled in series with one another between the supply rail and the I/O pad, and wherein the first pull-up transistor is coupled between the I/O pad and the second and third pull-up transistors.

Example 10 is the circuit of Example 5, wherein the dynamic biasing circuit is to provide the dynamic bias voltage to the pull-up transistor during a receive mode of the transceiver.

Example 11 is the circuit of any one of Examples 1 to 4, wherein the transceiver includes a receive circuit, and wherein the transistor is an electrical overstress (EOS) protection transistor of the receive circuit.

Example 12 is a method for biasing a transceiver, the method comprising: detecting a voltage level of a data signal on an input/output (I/O) pad, wherein the data signal swings between a first voltage level and a second voltage level; generating a dynamic bias voltage based on the detected voltage level, wherein the dynamic bias voltage is a first bias voltage when the voltage level of the data signal is about the first voltage level, and a second bias voltage when the voltage level of the data signal is about the second voltage level, wherein the second bias voltage is greater than the first bias voltage; and providing the dynamic bias voltage to one or more transistors of a transceiver that is coupled to the I/O pad.

Example 13 is the method of Example 12, wherein the providing the dynamic bias voltage to one or more transistors of the transceiver includes providing the dynamic bias voltage to one or more transistors of a transmit driver of the transceiver responsive to the transceiver being in a receive mode.

Example 14 is the method of Example 13, wherein providing the dynamic bias voltage to one or more transistors comprises providing the dynamic bias voltage to a pull-up transistor of the transmit driver, coupled between the I/O pad and a supply rail, and a pull-down transistor of the transmit driver, coupled between the I/O pad and a ground terminal.

Example 15 is the method of Example 14, wherein the pull-up transistor is a first pull-up transistor, wherein the pull-down transistor is a first pull-down transistor, and wherein the method further comprises: providing a first static bias voltage to a second pull-up transistor; and providing a second static bias voltage to a second pull-down transistor, the second static bias voltage being less than the first static bias voltage.

Example 16 is the method of any one of Examples 12 to 15, wherein providing the dynamic bias voltage to one or more transistors comprises providing the dynamic bias voltage to one or more transistors of a receive circuit of the transceiver.

Example 17 is a computing system comprising: a touch screen display; a processor coupled to the touch screen display; an input/output (I/O) pad; and a transceiver coupled to the processor and to the I/O pad. The transceiver includes: transmit circuitry including a transmit driver to transmit data signals via the I/O pad during a transmit mode of the transceiver; and receive circuitry to receive data signals via the I/O pad during a receive mode of the transceiver. The computing system further includes a dynamic biasing circuit coupled to the transceiver to, during the receive mode of the transceiver, provide a selected one of a first bias voltage or a second bias voltage to one or more transistors of the transmit driver, the first bias voltage or second bias voltage selected based on a voltage level at the I/O pad.

Example 18 is the system of Example 17, wherein the dynamic biasing circuit is to provide the first bias voltage to the one or more transistors of the transmit driver when the voltage level at the I/O pad is a first voltage level, and is to provide the second bias voltage to one or more transistors of the transmit driver when the voltage level at the I/O pad is a second voltage level, wherein the second bias voltage is greater than the first bias voltage and wherein the second voltage level is greater than the first voltage level.

Example 19 is the system of Example 17: wherein the transmit driver includes a plurality of pull-up transistors coupled between the I/O pad and a supply rail, the plurality of pull-up transistors including a first pull-up transistor; wherein the transmit driver further includes a plurality of pull-down transistors coupled between the I/O pad and a ground terminal, the plurality of pull-down transistors including a first pull-down transistor; and wherein the dynamic biasing circuit is to provide the selected one of the first or second bias voltage to the first pull-up transistor and the first pull-down transistor.

Example 20 is the system of Example 19, wherein the plurality of pull-up transistors further includes a second pull-up transistor that is to receive a first static bias voltage, and wherein the plurality of pull-down transistors further includes a second pull-down transistor that is to receive a second static bias voltage that is different than the first static bias voltage.

Example 21 is the system of Example 20, wherein the first pull-up transistor is coupled between the I/O pad and the second pull-up transistor, and wherein the first pull-down transistor is coupled between the I/O pad and the second pull-down transistor.

Example 22 is the system of Example 17, wherein the dynamic biasing circuit is further to provide a selected one of the first bias voltage or the second bias voltage to one or more transistors of the receive circuitry, the first or second bias voltage selected based on the voltage level at the I/O pad.

Example 23 is the system of any one of Examples 17 to 22, wherein the dynamic biasing circuit includes: a first voltage terminal to receive the first bias voltage; a second voltage terminal to receive the second bias voltage; an output terminal; a first switch transistor coupled between the first voltage terminal and the output terminal; a second switch transistor coupled between the second voltage terminal and the output terminal; a first node coupled to the I/O pad via a first diode; and a second diode coupled between the first node and a second node; wherein a gate terminal of the second switch transistor is coupled to the first node; and wherein a gate terminal of the first switch transistor is coupled to the second node.

Example 24 is the system of Example 23, wherein the dynamic biasing circuit further includes one or more diodes coupled between the first voltage terminal and a gate terminal of the second switch transistor.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

What is claimed is:

1. A circuit comprising:
an input/output (I/O) pad to receive a data signal;
a transceiver coupled to the I/O pad, the transceiver including a transistor coupled to the I/O pad; and
a dynamic biasing circuit coupled to the I/O pad and the transceiver, the dynamic biasing circuit to:
detect a voltage level of the data signal on the I/O pad;
generate a dynamic bias voltage having a value based on the detected voltage level of the data signal, wherein the dynamic biasing circuit is to selectively generate a first bias voltage or a second bias voltage as the dynamic bias voltage; and
provide the dynamic bias voltage to the transistor of the transceiver;
wherein the dynamic biasing circuit includes:
a first voltage terminal to receive the first bias voltage;
a second voltage terminal to receive the second bias voltage;
an output terminal to receive the dynamic bias voltage;
a first switch transistor coupled between the first voltage terminal and the output terminal;
a second switch transistor coupled between the second voltage terminal and the output terminal;
a first node coupled to the I/O pad via a first diode; and
a second diode coupled between the first node and a second node;
wherein a gate terminal of the second switch transistor is coupled to the first node; and
wherein a gate terminal of the first switch transistor is coupled to the second node.

2. The circuit of claim 1, wherein the dynamic biasing circuit further includes one or more diodes coupled between the first voltage terminal and the gate terminal of the second switch transistor.

3. The circuit of claim 1, wherein the transceiver includes a transmit driver, and wherein the transistor is a pull-up transistor of the transmit driver, the pull-up transistor coupled between the I/O pad and a supply rail.

4. The circuit of claim 3, wherein the transmit driver further includes a pull-down transistor coupled between the I/O pad and a ground terminal, wherein the dynamic biasing circuitry is further to provide the dynamic bias voltage to the pull-down transistor.

5. The circuit of claim 3, wherein the pull-up transistor is a first pull-up transistor, wherein the transmit driver includes a plurality of pull-up transistors including the first pull-up transistor and a second pull-up transistor that is to receive a pull-up signal.

6. The circuit of claim 5, wherein the transmit driver further includes a third pull-up transistor that is to receive a static bias voltage.

7. The circuit of claim 6, wherein the first, second, and third pull-up transistors are coupled in series with one another between the supply rail and the I/O pad, and wherein the first pull-up transistor is coupled between the I/O pad and the second and third pull-up transistors.

8. The circuit of claim 3, wherein the dynamic biasing circuit is to provide the dynamic bias voltage to the pull-up transistor during a receive mode of the transceiver.

9. The circuit of claim 1, wherein the transceiver includes a receive circuit, and wherein the transistor is an electrical overstress (EOS) protection transistor of the receive circuit.

10. A method comprising:
detecting a voltage level of a data signal on an input/output (I/O) pad, wherein the data signal swings between a first voltage level and a second voltage level;

generating a dynamic bias voltage based on the detected voltage level, wherein the dynamic bias voltage is a first bias voltage when the voltage level of the data signal is about the first voltage level, and a second bias voltage when the voltage level of the data signal is about the second voltage level, wherein the second bias voltage is greater than the first bias voltage; and providing the dynamic bias voltage to a first pull-up transistor of a transmit driver, coupled between the I/O pad and a supply rail, and a first pull-down transistor of the transmit driver, coupled between the I/O pad and a ground terminal, wherein the providing the dynamic bias voltage to one or more transistors of the transceiver includes providing the dynamic bias voltage to one or more transistors of a transmit driver of the transceiver responsive to the transceiver being in a receive mode;

providing a first static bias voltage to a second pull-up transistor of the transmit driver; and providing a second static bias voltage to a second pull-down transistor of the transmit driver, the second static bias voltage being less than the first static bias voltage.

11. The method of claim 10, further comprising providing the dynamic bias voltage to one or more transistors of a receive circuit of the transceiver.

12. A system comprising:
a touchscreen display;
a processor coupled to the touchscreen display; and
an input/output (I/O) pad;
a transceiver coupled to the processor and to the I/O pad, the transceiver including:
transmit circuitry including a transmit driver to transmit data signals via the I/O pad during a transmit mode of the transceiver;
receive circuitry to receive data signals via the I/O pad during a receive mode of the transceiver; and
a dynamic biasing circuit coupled to the transmit circuitry to, during the receive mode of the transceiver, provide a selected one of a first bias voltage or a second bias voltage to one or more transistors of the transmit driver, the first bias voltage or second bias voltage selected based on a voltage level at the I/O pad, wherein the dynamic biasing circuit includes:
a first voltage terminal to receive the first bias voltage;
a second voltage terminal to receive the second bias voltage;
an output terminal;
a first switch transistor coupled between the first voltage terminal and the output terminal;
a second switch transistor coupled between the second voltage terminal and the output terminal;
a first node coupled to the I/O pad via a first diode; and
a second diode coupled between the first node and a second node;
wherein a gate terminal of the second switch transistor is coupled to the first node; and
wherein a gate terminal of the first switch transistor is coupled to the second node.

13. The system of claim 12, wherein the one or more transistors of the transmit driver include a pull-up transistor, and wherein the dynamic biasing circuit is to provide the first bias voltage to the pull-up transistor when the voltage level at the I/O pad is a first voltage level, and is to provide the second bias voltage to the pull-up transistor when the voltage level at the I/O pad is a second voltage level, wherein the second bias voltage is greater than the first bias voltage and wherein the second voltage level is greater than the first voltage level.

14. The system of claim 12:
wherein the transmit driver includes a plurality of pull-up transistors coupled between the I/O pad and a supply rail, the plurality of pull-up transistors including a first pull-up transistor;
wherein the transmit driver further includes a plurality of pull-down transistors coupled between the I/O pad and a ground terminal, the plurality of pull-down transistors including a first pull-down transistor; and
wherein the dynamic biasing circuit is to provide the selected one of the first or second bias voltage to the first pull-up transistor and the first pull-down transistor.

15. The system of claim 14, wherein the plurality of pull-up transistors further include a second pull-up transistor that is to receive a first static bias voltage, and wherein the plurality of pull-down transistors further include a second pull-down transistor that is to receive a second static bias voltage that is different than the first static bias voltage.

16. The system of claim 15, wherein the first pull-up transistor is coupled between the I/O pad and the second pull-up transistor, and wherein the first pull-down transistor is coupled between the I/O pad and the second pull-down transistor.

17. The system of claim 12, wherein the dynamic biasing circuit is further to provide a selected one of the first bias voltage or the second bias voltage to one or more transistors of the receive circuitry, the first or second bias voltage selected based on the voltage level at the I/O pad.

18. The system of claim 12, wherein the dynamic biasing circuit further includes one or more diodes coupled between the first voltage terminal and a gate terminal of the second switch transistor.

* * * * *